No. 801,355. PATENTED OCT. 10, 1905.
E. J. BERG.
SELF PROPELLED VEHICLE AND METHOD OF CONTROLLING THE SAME.
APPLICATION FILED APR. 20, 1904.
2 SHEETS—SHEET 1.
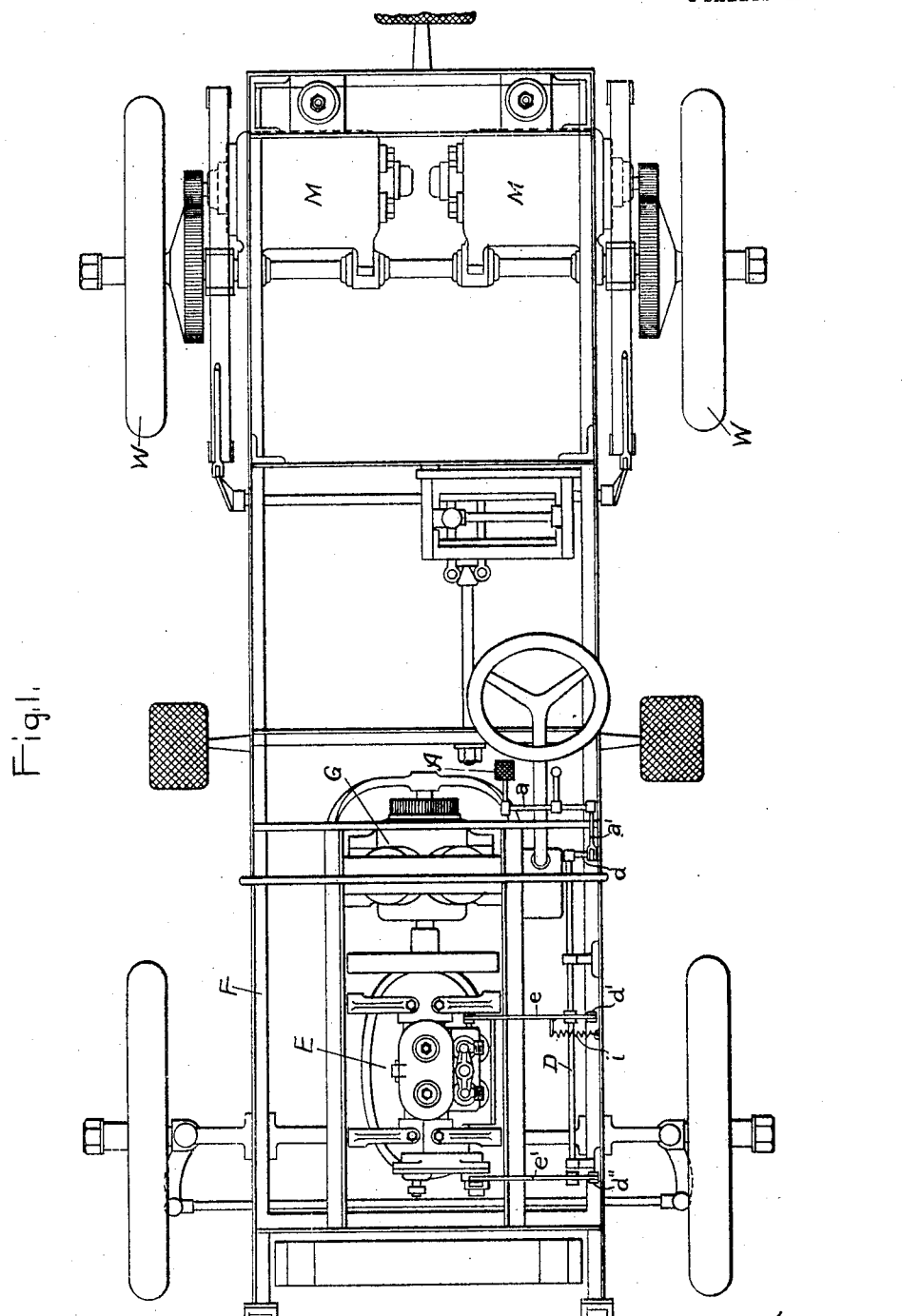
WITNESSES:
INVENTOR:
Ernst J. Berg.
by
Atty.

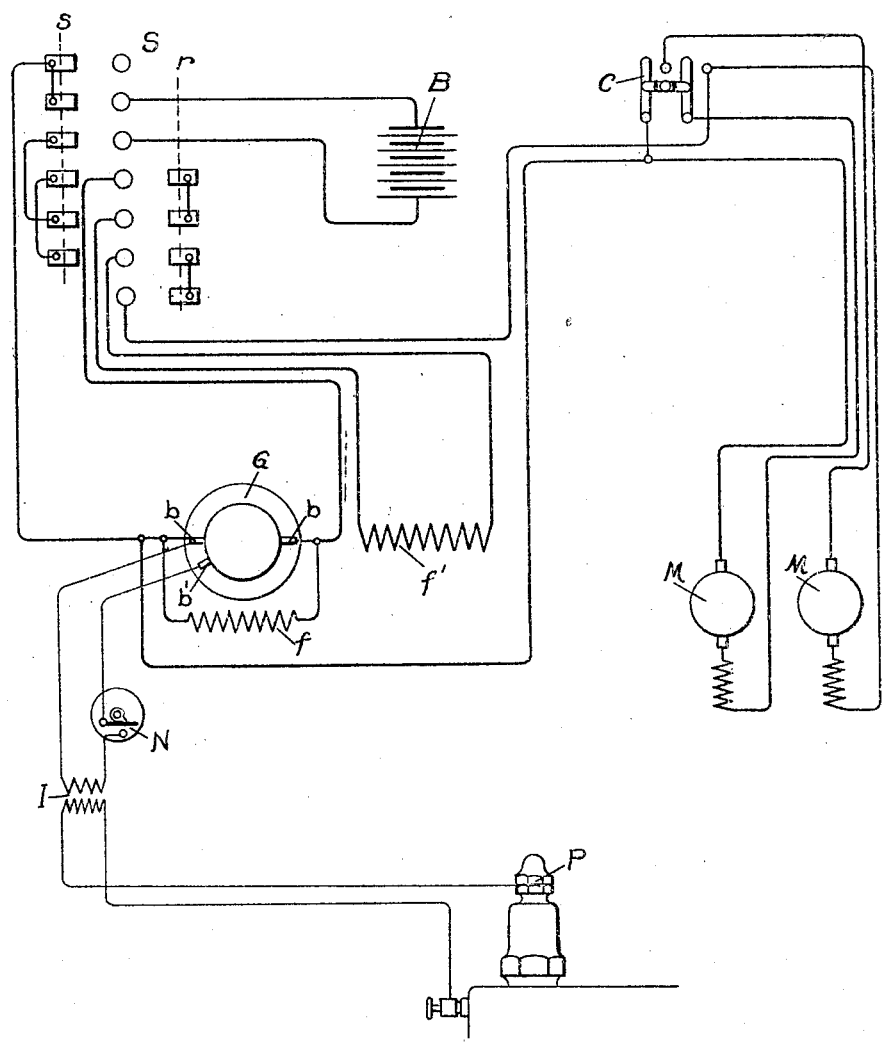

UNITED STATES PATENT OFFICE.

ERNST J. BERG, OF SCHENECTADY, NEW YORK, ASSIGNOR TO GENERAL ELECTRIC COMPANY, A CORPORATION OF NEW YORK.

SELF-PROPELLED VEHICLE AND METHOD OF CONTROLLING THE SAME.

No. 801,355. Specification of Letters Patent. Patented Oct. 10, 1905.

Application filed April 20, 1904. Serial No. 204,052.

*To all whom it may concern:*

Be it known that I, ERNST J. BERG, a citizen of the United States, residing at Schenectady, county of Schenectady, State of New York, have invented certain new and useful Improvements in Self-Propelled Vehicles and Methods of Controlling the Same, of which the following is a specification.

My invention relates to self-propelled vehicles, and has especial reference to that class of vehicle deriving its motive power from an electric generator driven by a prime mover—such, for instance, as an internal-combustion engine.

One of the objects of my invention is to provide a novel method of controlling the speed of such vehicles over wide ranges.

Another object is to provide a novel system of control which shall be simpler than control systems heretofore used, which shall render it possible to obtain a uniform acceleration from rest to full speed instead of the step-by-step acceleration usually employed, and which shall enable the necessary output to be obtained from the motive parts with a minimum wear and tear thereon.

In the operation of vehicles deriving their motive power from an electric generator driven by a prime mover it has heretofore been the universal custom to operate the prime mover at a constant speed for all loads and to obtain the necessary variation in speed and torque of the vehicle by varying the electric circuits. Such a control not only necessitates careful manipulation of the controlling-switch, but also gives only a step-by-step acceleration, the number of steps corresponding to the number of points on the controlling-switch. Furthermore, since the prime mover is always operated at constant speed it is subject to a wear and tear corresponding to that speed, which is frequently higher than necessary for the desired output. I believe that this former method of control was based on the mistaken idea that an internal-combustion engine was essentially as regards maximum efficiency a constant-speed machine, so that while in vehicles having mechanical speed-changing gears speed control of the engine was employed to supplement the action of the gears, which were necessarily not elastic, the flexibility of electric drives was always utilized to the fullest extent to obtain a substantially constant engine speed. I have discovered that the best results with such a vehicle as regards wear and tear, heating, and efficiency of operation as a whole are obtained not by maintaining the engine speed constant and varying the electrical connections to vary the speed, but rather by connecting the electric circuits for highest speed and varying the engine speed, keeping it always as low as is compatible with the output required. I thus take advantage of the elasticity of the electric transmission, which acts as an elastic connection between the engine and the driving-wheels to obtain a speed control over wide ranges and with much more rapid acceleration than would be possible with a mechanical transmission which loads the engine unyieldingly with the entire inertia of the vehicle and makes rapid acceleration over wide ranges by varying the engine speed an impossibility. A uniform acceleration is thus obtained in the simplest manner, and both wear and tear and heating are reduced to the minimum. Manipulation of the electric circuits is resorted to only when a change of the torque ratio is necessitated by heavy grades or bad roads. Furthermore, I provide for this control by means of a single foot-pedal requiring the minimum of attention on the part of the operator.

I have found that for purposes of an electric drive in automobiles, particularly when the speed of the prime mover is varied in operation, a compound-wound generator is particularly desirable for use. Such a machine maintains its excitation over wider ranges of speed than would be possible with a shunt-wound generator.

My invention will best be understood from the accompanying drawings, in which—

Figure 1 shows a plan view of an automobile arranged in accordance with my invention, the car-body being removed in order to show the motive parts. Fig. 2 shows diagrammatically the arrangement of the electric circuits.

In Fig. 1, E represents a prime mover, such as a gas-engine, which is supported from the frame F of the vehicle. G represents an electric generator, the armature of which is mounted on the shaft of engine E. M M represent two motors adapted to be driven by the generator G and connected through gearing or other suitable means to the driving-wheels W of the vehicle. A represents a foot-pedal which is mounted on the shaft $a$ and which when depressed produces a rotation of this shaft. The shaft $a$ carries a lever $a'$, which engages a lever $d$ on the shaft D. When pedal A is depressed, lever $d$ is consequently raised and shaft D rotated. Shaft D carries two other levers $d'$ and $d''$, which are connected to rods $e$ and $e'$, respectively, which are advanced and retracted as the shaft D is rotated. By means of these rods the speed of the engine is controlled in any suitable manner—as, for instance, by advancing and retarding the spark and by regulating the mixture of the engine by throttling the admission of fuel to the engine or varying its exhaust. Either of these methods of control may be used independently, if desired; but I prefer to use them together, as a wider range of speed variation and more efficient operation may be thereby obtained. $i$ is a spring acting to retract the rods $e\ e'$ to the position shown when the pressure on pedal A is removed. It will be seen that by this arrangement by varying the position of the pedal A the speed of the engine E may be varied over wide limits and that independently of the circuit connections between the motors M M and the generator G or of the variation therein the output of the generator, and consequently the speed of the vehicle, may be varied at will. Furthermore, the pedal A is not limited to a fixed number of positions, as in the case of the controlling-switch, and a practically infinite number of speeds may be obtained and a wholly uniform acceleration from rest to full speed secured. Furthermore, the manipulation of the pedal requires less attention on the part of the operator than would be needed for moving a controlling-switch to its several positions. Also the speed of the engine may be maintained at a value just sufficient to give the desired output, which will be frequently much lower than the maximum engine speed, so that much wear and tear on the engine is saved.

Referring now to Fig. 2, I have shown the generator G as a compound-wound machine having a shunt-field $f$ and a series field $f'$. A compound-wound machine is best adapted for operation at varying speeds, since it is better able to hold its excitation at low speeds than is a shunt-machine and does not produce as great a variation on voltage with varying load as does a series machine. I have shown the generator G connected to two motors M M through the double-throw switch C. In case it is not necesary to change the torque ratio of the generator and motors a simple switch may be provided for opening the circuit to the motors while the generator is being operated as a motor to start the engine; but since it is desirable on grades to be able to change the torque ratio I prefer to employ a controlling-switch adapted to make this change. Thus I have shown the switch C adapted to connect the motors M M in series or in parallel, and thereby to change the torque ratio of motors and generator. Of course if a single motor were used the variation in torque ratio would be obtained in some other way, as by varying the field strength of motor or generator, as will be understood by those skilled in the art. For ordinary operation of the vehicle no manipulation of switch C is required. The motors may be connected to the generator in parallel, for instance, and all speed control obtained by controlling the prime mover, switch C being used merely on grades to throw the motors in series, and thus to act as a gear-changer to obtain the necessary torque. S represents a starting-switch having seven stationary contacts and two sets of movable contacts, as shown. The two positions of switch S, which are indicated by the dotted lines $s$ and $r$, respectively, correspond to the starting and running positions. When the switch S is in the position indicated by $r$, the series field $f'$ of generator G is connected in series with the generator and with the controlling-switch C in the usual manner. When the vehicle is at rest and it is desired to start the prime mover or engine, the switch S is thrown to the position indicated by the dotted line $s$. It will be seen by tracing out the circuits that the connection of series field $f'$ is reversed relative to the armature of generator G and that generator G is connected, with its series field thus reversed, to the battery B. The generator G will then start as a motor, bringing the engine up to speed, the reversal of the series field adapting the machine for operation as a compound-wound motor and greater torque being thus obtained than if the shunt-field alone were utilized.

It will be seen from Fig. 2 that the generator G in addition to the usual set or sets of brushes $b\ b$ has an auxiliary brush $b'$, displaced by a comparatively small angle from one of the brushes $b$. A circuit is completed from brush $b$ to brush $b'$ through the primary winding of the induction or spark coil I and through the make-and-break switch N. The secondary winding of the induction-coil I is connected in the usual manner to the spark-plug P of the engine. By using this auxiliary brush I am enabled to obtain a fraction of the terminal voltage of the generator suitable for use with the induction-coil I, and thereby do away with the necessity of keeping the battery B in operation throughout the operation of the vehicle.

Although I have shown a complete embodiment of my invention, it will be understood that the details of construction and arrangement may be greatly varied without departing from the spirit of my invention. Accordingly I do not desire to limit myself to the particular construction and arrangement of parts here shown, since changes therein which do not depart from the spirit of my invention and which are within the scope of the appended claims will be obvious to those skilled in the art.

What I claim as new, and desire to secure by Letters Patent of the United States, is—

1. The method of controlling over wide ranges the speed of a self-propelled vehicle deriving its motive power from an electric generator driven by a prime mover, which consists in varying over wide ranges the speed of the prime mover.

2. The method of controlling over wide ranges the speed of a self-propelled vehicle deriving its motive power from an electric generator driven by an internal-combustion engine, which consists in advancing and retarding the mixture of the engine.

3. The method of operating a vehicle propelled by an electric motor or motors supplied with current from a generator driven by a prime mover carried by the vehicle, which consists in varying the speed of the prime mover over wide ranges without disturbing the electrical circuits of the generator and the motor or motors to vary the speed of the vehicle.

4. The method of operating a self-propelled vehicle propelled by an electric motor or motors supplied with current from a generator driven by a prime mover carried by the vehicle, which consists in varying the speed of the prime mover over wide ranges, without disturbing the electrical circuits, to vary the speed of the vehicle and varying the electrical circuits to change the torque ratio of generator and motors.

5. The method of operating a self-propelled vehicle deriving its motive power from an electric generator driven by a prime mover and electric motors driven by said generator, which consists in varying the speed of the prime mover over wide ranges to vary the speed of the vehicle and varying the electric circuits to change the torque ratio of the generator and motors.

6. The method of operating a self-propelled vehicle deriving its motive power from an electric generator driven by a prime mover and electric motors driven by said generator, which consists in connecting the motors in parallel to said generator and varying the speed of the prime mover over wide ranges to vary the speed of the vehicle without disturbing the electrical connections.

7. In a self-propelled vehicle, a prime mover, an electric generator having one member stationary and the other driven by said prime mover, an electric motor driven by said generator, and means for varying the speed of the prime mover over wide ranges.

8. In a self-propelled vehicle, a prime mover, a compound-wound electric generator having one member stationary and the other driven by said prime mover, an electric motor driven by said generator, and means for varying the speed of said prime mover over wide ranges without disturbing the electrical connections.

9. In a self-propelled vehicle, an internal-combustion engine, an electric generator having one member stationary and the other driven by said prime mover, an electric motor driven by said generator, and means for advancing the spark and for regulating the mixture of the engine to produce a wide variation of the engine speed.

10. In a self-propelled vehicle, an internal-combustion engine, an electric generator having one member stationary and the other driven by said prime mover, an electric motor driven by said generator, a lever, and means controlled by said lever for varying the engine speed over wide ranges.

11. In a self-propelled vehicle, an internal-combustion engine, an electric generator having one member stationary and the other driven by said prime mover, an electric motor driven by said generator, a lever, and means controlled by said lever for simultaneously advancing the spark and regulating the mixture of the engine to vary the speed of the engine over wide ranges.

In witness whereof I have hereunto set my hand this 19th day of April, 1904.

ERNST J. BERG.

Witnesses:
BENJAMIN B. HULL,
HELEN ORFORD.